(12) United States Patent
Lee et al.

(10) Patent No.: US 9,908,204 B2
(45) Date of Patent: Mar. 6, 2018

(54) APPARATUS FOR INTERCHANGING WELDING TIPS OF SPOT WELDING GUN

(71) Applicant: KOREA T&M CO., LTD., Ulju-gun, Ulsan (KR)

(72) Inventors: Seung-Hae Lee, Ulsan (KR); Du-Hyeon Song, Ulsan (KR); Joo-Hyun Lee, Pohang-si (KR)

(73) Assignee: KOREA T&M CO., LTD., Uliju-gun, Ulsan (KR)

( * ) Notice: Subject to any disclaimer, the term of this patent is extended or adjusted under 35 U.S.C. 154(b) by 667 days.

(21) Appl. No.: 14/377,930

(22) PCT Filed: Nov. 27, 2012

(86) PCT No.: PCT/KR2012/010111
§ 371 (c)(1),
(2) Date: Aug. 11, 2014

(87) PCT Pub. No.: WO2014/021510
PCT Pub. Date: Feb. 6, 2014

(65) Prior Publication Data
US 2015/0020382 A1    Jan. 22, 2015

(30) Foreign Application Priority Data
Jul. 31, 2012    (KR) .................... 10-2012-0083701

(51) Int. Cl.
*B23P 6/00*    (2006.01)
*B23K 11/31*    (2006.01)
*B23K 11/30*    (2006.01)

(52) U.S. Cl.
CPC ............ *B23P 6/00* (2013.01); *B23K 11/3072* (2013.01); *Y10T 29/5313* (2015.01)

(58) Field of Classification Search
CPC .. B23K 11/3072; B23K 3/0369; B23K 3/026; B23K 11/008–11/0086;
(Continued)

(56) References Cited

U.S. PATENT DOCUMENTS 1,633,593 A * 6/1927 Larbalester ............. B23P 19/00
29/237
2,473,772 A * 6/1949 Vang ...................... B23K 11/26
219/86.32

(Continued)

FOREIGN PATENT DOCUMENTS

EP    1690625 A1    8/2006
JP    2005-118834 A    5/2005
(Continued)

*Primary Examiner* — Peter DungBa Vo
*Assistant Examiner* — Kaying Kue
(74) *Attorney, Agent, or Firm* — R. Neil Sudol; Henry D. Coleman

(57) ABSTRACT

The present invention relates to an apparatus for interchanging welding tips of a spot welding gun. According to the present invention, an apparatus for interchanging welding tips of a spot welding gun comprises: a post frame provided with a connection plate on a top surface; a tip-removal means coupled at a predetermined position on one side surface of the post frame; and a tip-setting means coupled to a top surface of the connection plate.

18 Claims, 12 Drawing Sheets

(58) Field of Classification Search
CPC ..... B23K 11/314–11/315; B23K 11/10–11/12; B23P 6/00; B23P 19/00; B23P 19/04; B23P 19/10; Y10T 483/17; Y10T 483/00; Y10T 29/53265; Y10T 29/49123; Y10T 29/4973
USPC ...... 29/402.01–402.19; 219/86.1–94; 228/55
See application file for complete search history.

(56) References Cited

U.S. PATENT DOCUMENTS

| | | | | | |
|---|---|---|---|---|---|
| 2,476,187 | A | * | 7/1949 | Gordon | B23K 11/31 219/86.33 |
| 2,795,688 | A | * | 6/1957 | McCaffrey, Sr. | B23K 11/3009 219/118 |
| 2,890,888 | A | * | 6/1959 | Damijonaitis | B23B 31/1261 279/106 |
| 3,148,264 | A | * | 9/1964 | Clark, Jr. | B23K 11/10 219/86.8 |
| 3,562,482 | A | * | 2/1971 | Friedberg | B23K 11/3009 219/119 |
| 4,794,221 | A | * | 12/1988 | Takabe | B23K 11/3072 219/86.1 |
| 4,935,595 | A | * | 6/1990 | Fuse | B23K 11/3072 219/86.25 |
| 4,969,247 | A | * | 11/1990 | Rossi | B23K 11/3072 29/426.4 |
| 5,065,932 | A | * | 11/1991 | Hayden | B23K 3/06 219/209 |
| 5,073,692 | A | * | 12/1991 | Jackson | B23K 11/3072 219/86.7 |
| 5,123,808 | A | * | 6/1992 | Fath | H01R 43/01 29/749 |
| 5,386,092 | A | * | 1/1995 | Dufrenne | B23K 11/252 219/117.1 |
| 5,387,774 | A | * | 2/1995 | Boyer | B23K 11/3018 219/117.1 |
| 5,603,857 | A | * | 2/1997 | Mickle | B23K 1/018 219/228 |
| 5,661,897 | A | * | 9/1997 | Kaneda | H01R 43/055 29/33 M |
| 5,750,952 | A | * | 5/1998 | Johnson | B23K 11/36 219/89 |
| 5,767,474 | A | * | 6/1998 | Shimada | B23K 11/3063 219/86.25 |
| 5,774,978 | A | * | 7/1998 | Ishii | B23K 11/3063 29/821 |
| 5,970,609 | A | * | 10/1999 | Shioda | H01R 43/01 29/33 M |
| 6,049,053 | A | * | 4/2000 | Shimada | B23K 11/3072 219/86.1 |
| 7,120,997 | B2 | * | 10/2006 | Islam | B25B 27/10 29/748 |
| 7,439,471 | B2 | * | 10/2008 | Jaeger | B23K 9/26 219/125.1 |
| 7,624,613 | B2 | * | 12/2009 | Yu | H01R 43/0585 29/753 |
| 7,921,549 | B2 | * | 4/2011 | Chawgo | H01R 43/0427 29/33 M |
| 7,963,514 | B2 | * | 6/2011 | Li | G01M 99/007 269/46 |
| 8,001,679 | B2 | * | 8/2011 | Youtsey | H01R 43/22 29/748 |
| 9,089,925 | B2 | * | 7/2015 | Braeuer | B23K 11/3072 |
| 9,168,609 | B2 | * | 10/2015 | Kaeseler | B23K 11/3072 |
| 9,486,876 | B2 | * | 11/2016 | Braeuer | B23K 11/3072 |
| 2003/0002945 | A1 | * | 1/2003 | Sunaga | B23K 11/3063 409/140 |
| 2003/0051337 | A1 | * | 3/2003 | Holliday | B25B 27/10 29/751 |
| 2003/0106878 | A1 | * | 6/2003 | Sundstrom | B23K 11/3072 219/86.8 |
| 2003/0201253 | A1 | * | 10/2003 | Rigaux | B23K 11/3072 219/86.8 |
| 2004/0163238 | A1 | * | 8/2004 | Holliday | B25B 27/10 29/761 |
| 2004/0167001 | A1 | * | 8/2004 | Hagihara | B23K 9/32 483/7 |
| 2005/0016967 | A1 | * | 1/2005 | Izumi | B23K 11/3072 219/86.8 |
| 2005/0023250 | A1 | * | 2/2005 | Izumi | B23K 11/3072 219/86.8 |
| 2005/0211684 | A1 | * | 9/2005 | Jaeger | B23K 9/26 219/125.1 |
| 2006/0101630 | A1 | * | 5/2006 | Nakajima | B23K 11/3072 29/267 |
| 2006/0179646 | A1 | * | 8/2006 | Xie | H01R 43/048 29/750 |
| 2007/0234557 | A1 | * | 10/2007 | Nielsen | H01R 13/5224 29/751 |
| 2009/0173725 | A1 | * | 7/2009 | Holcomb | B23K 11/252 219/130.01 |
| 2009/0229099 | A1 | * | 9/2009 | Fukizawa | B23K 11/3072 29/244 |
| 2009/0289040 | A1 | * | 11/2009 | Boyd | B23K 11/11 219/86.41 |
| 2010/0147806 | A1 | * | 6/2010 | Nakajima | B23K 11/3072 219/86.25 |
| 2012/0241415 | A1 | * | 9/2012 | Machan | B23K 11/3072 219/86.8 |
| 2014/0374388 | A1 | * | 12/2014 | Schnipke | B23K 11/312 219/86.31 |
| 2015/0038306 | A1 | * | 2/2015 | Lee | B23K 11/3072 483/16 |

FOREIGN PATENT DOCUMENTS

| | | |
|---|---|---|
| KR | 10-2003-0006279 A | 1/2003 |
| KR | 10-2010-0024276 A | 3/2010 |

* cited by examiner

[a] [b] [c]

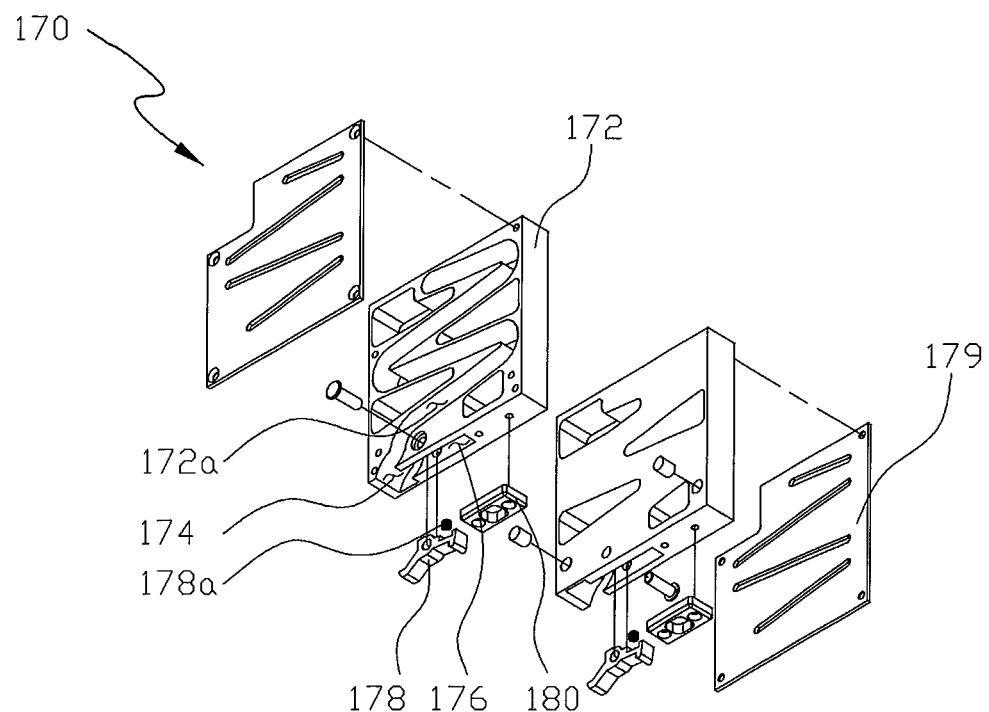

APPARATUS FOR INTERCHANGING WELDING TIPS OF SPOT WELDING GUN

CROSS-REFERENCE TO RELATED APPLICATION

This Application is a Section 371 National Stage Application of International Application No. PCT/KR2012/010111, filed on Nov. 27, 2012, the contents of which are hereby incorporated by reference in its entirety.

BACKGROUND OF THE INVENTION

Technical Field

The present invention relates to an apparatus for replacing the welding tip of a spot welding gun. More particularly, the present invention relates to an apparatus for replacing the welding tip of a spot welding gun, which is capable of automatically replacing the welding tip of a spot welding gun.

Background Art

In general, in quantity production for a specific product as in a vehicle product line, spot welding in which a welding part has high stability is chiefly used because the heating time is very short and working speed is fast compared to other welding and residual stress or deformation is small due to a narrow heating range.

Spot welding is welding in which point bonding is performed on a sheet without perforating a hole in the sheet, such as a riveted joint, by generating melting in contact parts using the generation of heat according to electric resistance and bonding the contact parts using pressure.

In general, spot welding is performed using a robot on which a welding gun is mounted. The welding gun includes a body installed through the medium of a frame combined with a robot arm and configured to have a timer, a contactor, a transformer, etc. for welding embedded, a shank 1 installed to face the bottom of the body and the top of the arm rotatably installed in the body by a hinge shaft, and a welding tip (or a tip) 2 that is attached to the end of the shank 1 and at which welding is performed.

FIG. 1 is a diagram illustrating a conventional method of changing the tip of a robot welding gun.

In order to change the tip of a welding robot used in a current vehicle body manufacturing plant for vehicles, the tip is changed using a tool as illustrated in FIG. 1.

To this end, a worker drives a safety device before entering a vehicle body product line, stops the operation of the welding robot, and separates the tip 2 from the shank 1 of the welding gun of the robot using a pipe wrench or a tip-dedicated tool. Furthermore, a worker mounts a new tip using the tool, checks the new tip, drives the robot, and checks the state of the new tip.

When such a tip change task is performed, the time taken to replace a tip is relatively long because a worker enters the manufacturing line and directly changes the tip in a non-operation time. Furthermore, although safety conditions are thoroughly observed, there may be a problem in that a big accident is caused because another worker drives a robot, resulting in a safety problem.

Furthermore, since tip change workability is different depending on the location of the welding gun of the robot, it is inconvenient to move the welding gun to a place where a task is easy before replacing a tip. As a result, there is a disadvantage in that the working time is increased.

Furthermore, if a tip needs to be replaced when a vehicle body product line is driven, the operation must be stopped while a worker replaces the tip. Accordingly, there are problems in that productivity is reduced due to non-operation factors and personal expenses attributable to working hours are increased.

Furthermore, the prior art is problematic in that welding quality is deteriorated because the tip of the shank combined with the tip is deformed by external force that is generated when the tip is separated from the shank of the welding gun of the robot using a tool.

DISCLOSURE

Technical Problem

Accordingly, the present invention has been made to solve the problems, and an object of the present invention is to provide an apparatus for replacing the welding tip of a spot welding gun, which is capable of improving workability and productivity and preventing a safety accident by automatically replacing the welding tip of a spot welding gun.

Technical Solution

In order to achieve the above and other objects of the present invention, in accordance with an embodiment of the present invention, there is provided an apparatus for replacing the welding tip of a spot welding gun, which is configured to include a post frame on a top surface of which a connection plate is provided; tip removal means combined with one side of the post frame at a specific location of the one side; and tip setting means combined with a top surface of the connection plate.

Tip supply means for supplying the welding tip to the tip setting means is installed on top of the tip setting means.

The tip supply means is configured to include a body having a tip storage unit formed therein in the height direction thereof; an opening formed at a specific location of the bottom of the body in such a way as to communicate with the tip storage unit; an opening and closing lever that is rotatably hinged and combined with an incision part formed at the bottom of the body from the opening in the length direction and that opens and closes the opening; and covers combined with both sides of the body.

At least one location setting block spaced apart from the opening and closing lever at a specific distance is provided at the bottom of the body.

The tip setting means is configured to include a body combined with the top surface of the connection plate; a tip accommodation unit formed within the body in the height direction of the body; a tip input hole formed at a specific location of the top surface of the body in such a way as to communicate with the tip accommodation unit; and covers combined with both sides of the body.

The body is combined with the top surface of the connection plate in such a way as to reciprocate in the width direction of the connection plate by an equalizer member provided on the top surface of the connection plate.

The equalizer member is configured to include a pair of fixation plates installed on the top surface of the connection plate with the body interposed between the pair of fixation plates; shafts inserted into respective through holes, spaced apart from each other at a specific distance, in the width direction of the shafts under the body in such a way as to penetrate the through holes and each configured to have both ends combined with the pair of fixation plates; and coil springs that are placed between the body and the fixation plates and that apply elastic force to the body.

The tip removal means is configured to include a main body combined with a specific location on one side of the post frame in a length direction; a cylinder installed at the bottom of the main body; and a tip removal unit combined with one end of the cylinder and placed to slide and move within the main body.

The main body is configured to include a vertical unit combined with the one side of the post frame; a horizontal unit that is horizontally protruded and formed under the vertical unit and that has a through hole formed at the central part of the horizontal unit; a body including first and second extension units that are spaced apart from each other at a specific distance, protruded, and formed in the length direction of the body on one side of the vertical unit and that include a first through hole and a second through hole, respectively, at the centers of the first and second extension units; a setting block that is combined with the vertical unit so that the setting block is placed between the first and the second extension units and that includes a pair of stoppers on both sides of the setting block; and a cover combined with the body.

A tip collection tank is combined with one side of the cover.

The tip removal unit is configured to include a body that includes space therein and incision parts that are formed on the outside of the body and that communicate with the space in the circumferential direction of the body; a pair of guides having respective U-shaped grooves formed on upper parts of the guides and combined with guide grooves formed in the length direction of the body on left and right sides of the body in such a way as to slide and move; a guide block that is placed within the space the body and has both sides combined with and fixed to the respective one sides of the pair of guides; and a spring having one end supported by a flange unit that is provided on an outer circumference surface of an extension unit extended and formed under the body and the other end supported by a guide ring that is inserted into a cylinder rod provided in the cylinder.

A pair of guide projections is downward slantly protruded and formed on both sides of an inside of incision parts that belong to the incision parts and that are formed at a front and rear of the body.

The tip setting means is configured to include a body including a tip accommodation unit formed in the height direction of the body, a tip input hole formed at a specific location on a top surface of the body in such a way as to communicate with the tip accommodation unit, and covers combined with both sides of the body; a tip transfer unit having one end combined with the bottom of the body and the other end combined with the top surface of the connection plate; and a tip fixation unit that is combined with one side of the tip transfer unit and that fixes the welding tip 20 transferred by the tip transfer unit.

The tip transfer unit is configured to include a base that is combined with the top surface of the connection plate and that includes a pair of guide grooves formed on a top surface of the base in the length direction of the base and an extension unit upwardly protruded and formed from one side of the pair of guide grooves; a pair of slide bars inserted into the pair of guide grooves in such a way as to slide and move; a guide block combined with one side of the base; and a cylinder that is combined with the other side of the base and that moves the pair of slide bars along the pair of guide grooves in a sliding way.

The tip fixation unit is configured to include a fixation block including a first fixation unit on a top surface of which a first insertion groove into which any one of the pair of slide bars is able to be inserted is formed and a second fixation unit combined with the first fixation unit on one side of the first fixation unit in such a way as to cross the first fixation unit and configured to have a second insertion groove into which another side bar is inserted formed at the bottom of the second fixation unit; a location setting member that is installed on one side of an inside of each of the first insertion groove and the second insertion groove and that corrects the location of the welding tip transferred to the first insertion groove and the second insertion groove by the pair of slide bars; and a location correction member installed at each of a first through hole and a second through hole formed at specific locations of the bottom of the first fixation unit and a top of the second fixation unit in such a way as to communicate with the first insertion groove and the second insertion groove.

An incision part is formed at a specific location on the lower part of the tip accommodation unit that faces the tip input hole, and a finger stop that selectively supplies the tip transfer unit with the welding tip received in the tip accommodation unit is rotatably installed in the incision part.

A miss-input prevention bracket that prevents the welding tip from being input to the tip accommodation unit through the tip input hole when the input direction of the welding tip supplied to the tip accommodation unit through the tip input hole is reversed is installed on one side of the tip input hole.

Tip dressing means is installed on one side of the post frame.

Dressing sensors that check a dressing state of the welding tip by measuring a color of the welding tip dressed by the tip dressing means are provided at specific locations on a top surface of the tip dressing means.

Advantageous Effect

In accordance with the present invention having the aforementioned construction, there are advantages in that workability and productivity can be improved and a safety accident can be prevented because the welding tip of a spot welding gun can be automatically replaced.

BRIEF DESCRIPTION OF THE DRAWINGS

FIG. 12 is an exploded perspective view of tip supply means in accordance with the first and the second embodiments of the present invention.

DESCRIPTION OF THE REFERENCE NUMERALS IN THE DRAWINGS

Figure 1:
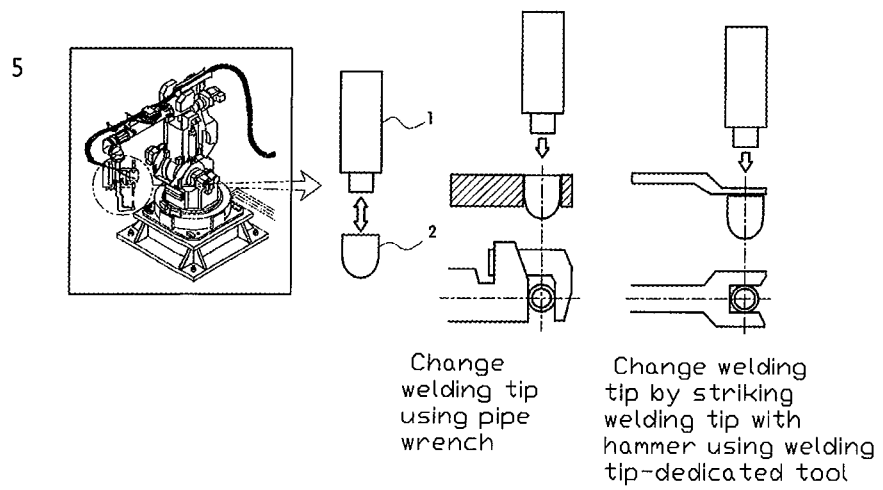
FIG. 1 is a diagram illustrating a conventional method for replacing the tip of a robot welding gun.

110: post frame
112: connection plate
120: tip removal means
135: tip collection tank
136: tip removal unit
150: tip setting means
160: equalizer member
170: tip supply means
180: location setting block
190: tip setting means
210: tip transfer unit
220: tip fixation unit
228: location correction member
234: location setting member

PREFERRED EMBODIMENTS OF THE INVENTION

Hereinafter, preferred embodiments of the present invention are described in more detail with reference to the accompanying drawings. The thickness of lines and the size of elements illustrated in the drawings may have been enlarged for the clarity of descriptions and for convenience' sake.

Furthermore, terms to be described later are defined by taking into consideration the functions of the embodiments of the present invention, and may be different according to the operator's intention or usage. Accordingly, the terms should be defined based on the overall contents of the specification.

First Embodiment

Figure 2:
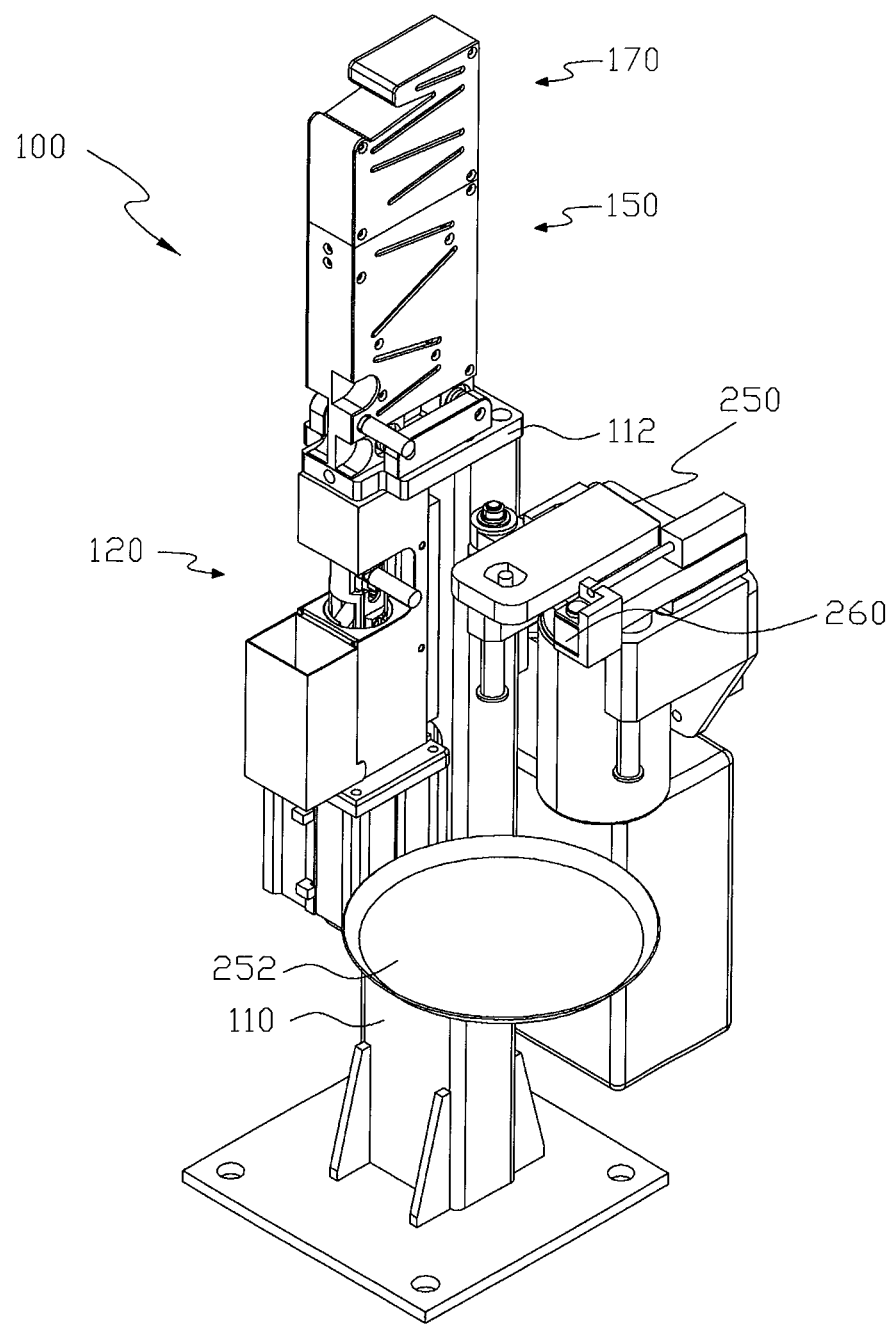
FIG. 2 is a perspective view of an apparatus for replacing the welding tip of a spot welding gun in accordance with a first embodiment of the present invention.
Figure 3:
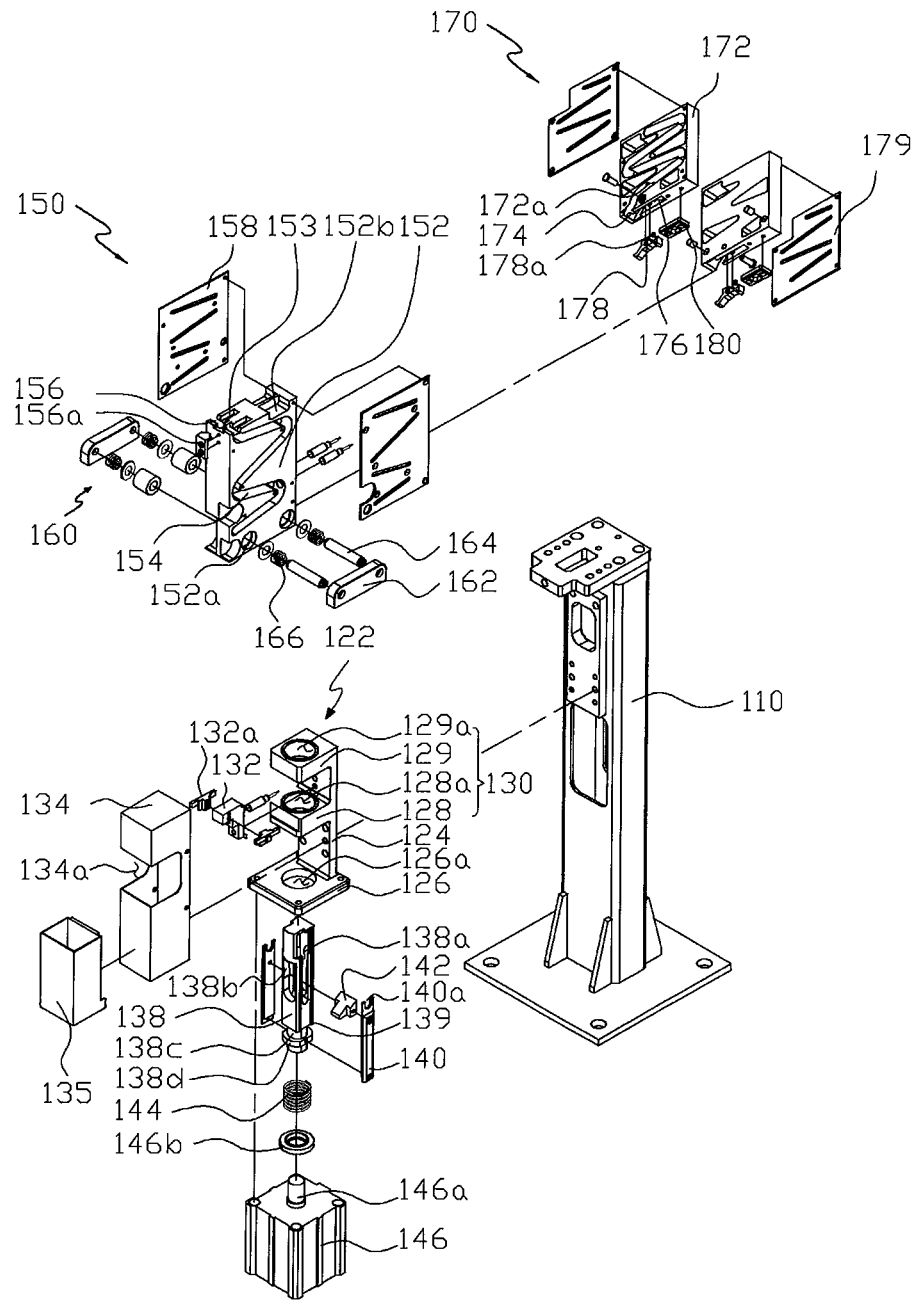
FIG. 3 is an exploded perspective view of the apparatus for replacing the welding tip of a spot welding gun illustrated in FIG. 2.
Figure 4:
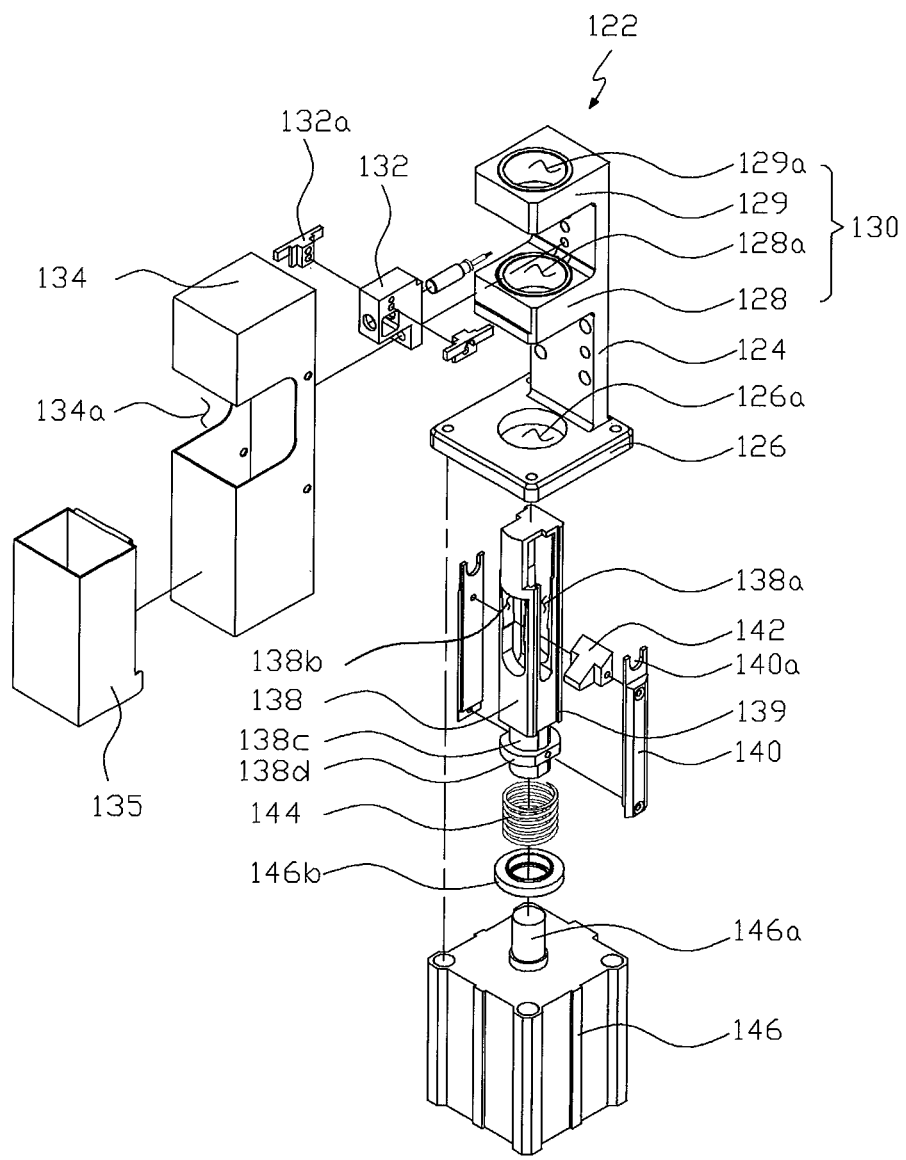
FIG. 4 is an exploded perspective view of tip removal means illustrated in FIG. 2.
Figure 5:
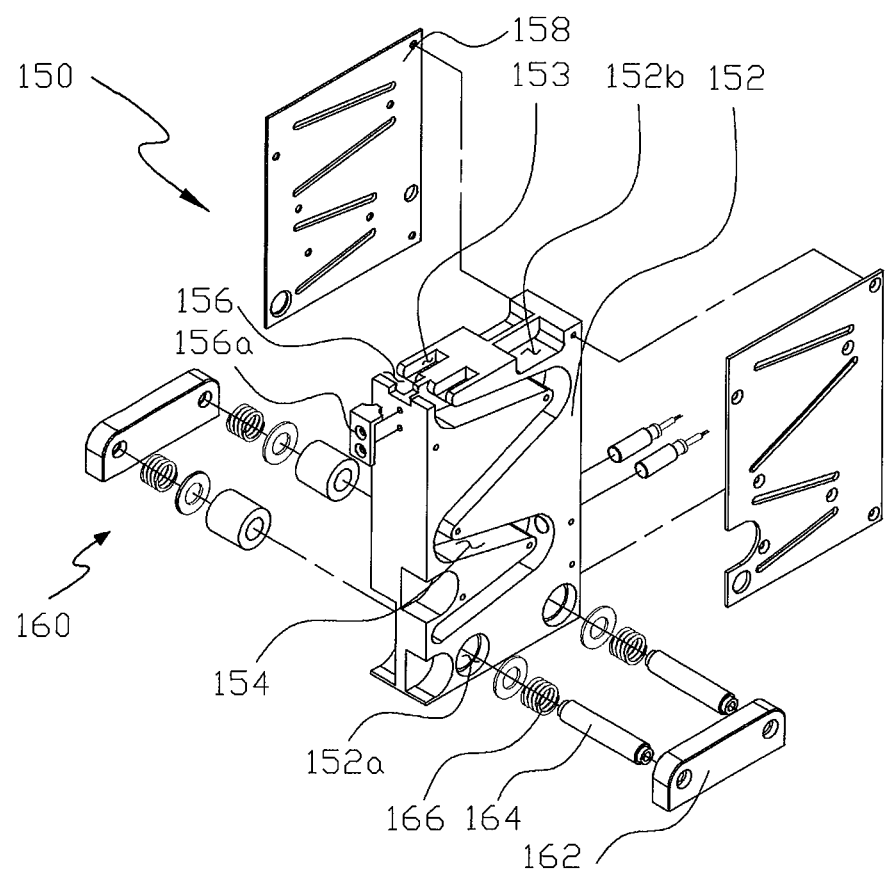
FIG. 5 is an exploded perspective view of tip setting means illustrated in FIG. 2.
Figure 6:
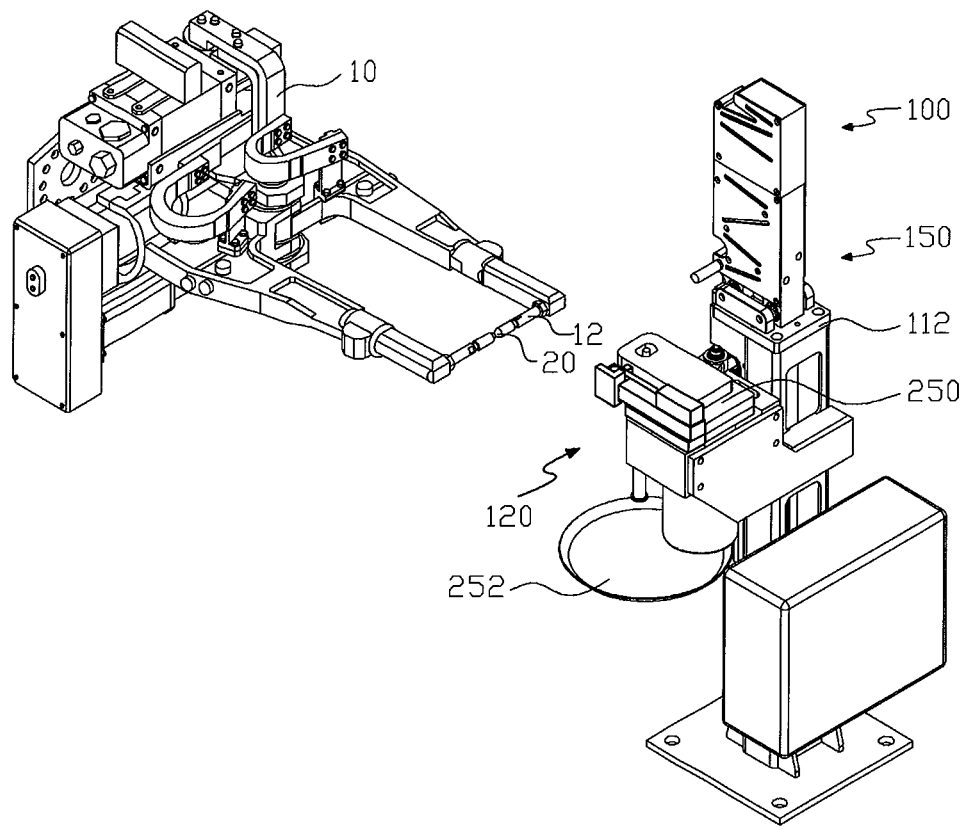
FIG. 6 is a diagram schematically illustrating the state in which the apparatus for replacing the welding tip of a spot welding gun in accordance with the first embodiment of the present invention is used.
Figure 7:
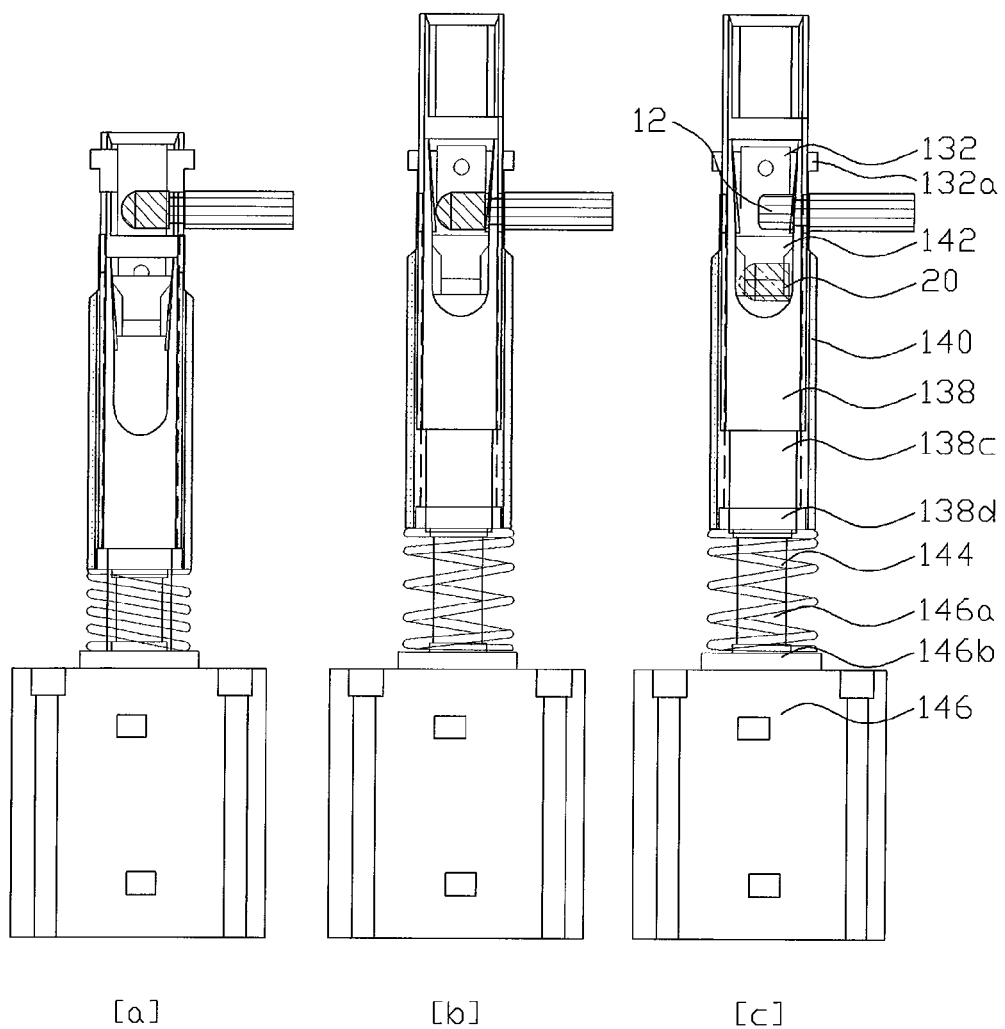
FIG. 7 is a diagram schematically illustrating an operation of removing, by the removal means, a welding tip in accordance with the first embodiment of the present invention.

FIG. 1 is a diagram illustrating a conventional method for replacing the tip of a robot welding gun, FIG. 2 is a perspective view of an apparatus for replacing the welding tip of a spot welding gun in accordance with a first embodiment of the present invention, FIG. 3 is an exploded perspective view of the apparatus for replacing the welding tip of a spot welding gun illustrated in FIG. 2, FIG. 4 is an exploded perspective view of tip removal means illustrated in FIG. 2, FIG. 5 is an exploded perspective view of tip setting means illustrated in FIG. 2, FIG. 6 is a diagram schematically illustrating the state in which the apparatus for replacing the welding tip of a spot welding gun in accordance with the first embodiment of the present invention is used, and FIG. 7 is a diagram schematically illustrating an operation of removing, by the removal means, a welding tip in accordance with the first embodiment of the present invention.

Referring to FIGS. 2 to 7, the apparatus 100 for replacing the welding tip of a spot welding gun 100 in accordance with the first embodiment of the present invention is configured to include a post frame 110, tip removal means 120, and tip setting means 150.

A connection plate 112 is provided on top of the post frame 110.

The tip removal means 120 is combined with one side of the post frame 110, and removes a welding tip 20 combined with the tip of the shank 12 of a spot welding gun 10.

Referring to FIG. 4, such tip removal means 120 is configured to include a main body 122 combined with one side of the post frame 110 at a specific location thereof in a length direction, a cylinder 146 installed at the bottom of the main body 122, and a tip removal unit 136 combined with one end of the cylinder 146 and placed to slide and move within the main body 122.

The main body 122 is configured to include a vertical unit 124 combined with one side of the post frame 110, a horizontal unit 126 that is horizontally protruded and formed under the vertical unit 124 and that has a through hole 126a formed at a central part thereof, a body 130 including first and second extension units 128, 129 that are spaced apart from each other at a specific distance, protruded, and formed in a length direction on one side of the vertical unit 124 and that include a first through hole 128a and a second through hole 129a, respectively, at the centers of the first and second extension units, a setting block 132 that is combined with the vertical unit 124 so that the setting block 132 is placed between the first and the second extension units 128, 129 and that comprises a pair of stoppers 132a on both sides of the setting block 132, and a cover 134 combined with the body 130.

In this case, the setting block 132 limits the location of the welding tip 20 that is removed from the tip of the shank 12 of the spot welding gun 10 by the tip removal unit 136 to be described later. The stoppers 132a prevent a body 138 that makes the tip removal unit 136 to slide and move within the main body 122 146 from being rotated by the cylinder.

Furthermore, the pair of stoppers 132a provided on both sides of the setting block 132 limits the distance that the pair of guides 140 goes up and down, and fixes the tip of the shank 12 of the spot welding gun 10 to a 'U'-shaped groove 140a formed at the top of a pair of guides 140.

An incision part 134a is formed at a specific location of the central part of the cover 134. The incision part 134a is combined with the tip of the shank 12 of the spot welding gun 10, and provides space in which the tip of the shank 12 of the spot welding gun 10 may be inserted into the tip removal means 120 so that the welding tip 20 can be removed by the tip removal means 120. Accordingly, the welding tip 20 removed from the tip of the shank 12 of the spot welding gun 10 by the tip removal means 120 is received in a tip collection tank 135 installed on one side of the cover 134.

The tip removal unit 136 is configured to include the body 138, the pair of guides 140, a guide block 142, and a spring 144.

The body 138 includes space therein and includes a plurality of incision parts 138a that is formed on the outside of the body and that communicates with the space in a circumferential direction thereof.

In this case, a pair of guide projections 138b is downward slantly protruded and formed on both sides of the inside of incision parts 138a that belong to the plurality of incision parts 138a and that are formed at the front and rear of the body 138 on the basis of the drawing.

The pair of guide projections 138b enables the welding tip 20, combined with the tip of the shank 12 of the spot welding gun 10, to be removed from the tip of the shank when the body 138 is raised by the cylinder 146 in the state in which the tip of the shank 12 of the spot welding gun 10 combined with the welding tip 20 is inserted and fixed between the stoppers 132a and the 'U'-shaped groove 140a formed at the top of the pair of guides 140 over the incision parts 138a formed on the right and left faces of the body 138.

The pair of guides 140 is combined with guide grooves 139 formed in the length direction of the body 138 on the left and right sides of the body 138 in such a way as to slide and move. The 'U'-shaped groove 140a is formed at the top of the pair of guides 140.

The guide block 142 is placed within the body 138, and has both sides combined with and fixed to respective one sides of the pair of guides 140.

The spring 144 has one end supported by a flange unit 138d that is formed in the outer circumference surface of an extension unit 138c extended and formed under the body 138 and has the other end configured to be supported by a guide ring 146b that is inserted into a cylinder rod 146a provided in the cylinder 146, thus applying elastic force to the pair of guides 140.

Referring to FIG. 5, the tip setting means 150 functions to combine the welding tip 20 with the tip of the shank 12 of the spot welding gun 10. The tip setting means 150 is configured to include a body 152 combined with a top surface of the connection plate 112, a tip accommodation unit 154 formed within the body 152 in the height direction of the body 152, a tip input hole 156 formed at a specific location of the top surface of the body 152 in such a way as to communicate with the tip accommodation unit 154, and covers 158 combined with both sides of the body 152.

In this case, the tip accommodation unit 154 is formed in a form, such as an 'S', 'M', or 'W' shape. The tip accommodation unit 154 preferably is configured so that the welding tip 20 input through the tip input hole 156 can be moved from the top of the tip accommodation unit 154 to the bottom due to its own weight.

Furthermore, the body 152 is combined in such a way as to reciprocate in the width direction of the connection plate 112 by an equalizer member 160 that is provided on a top surface of the connection plate 112. In such a case, an error that may occur when the tip of the shank 12 of the spot welding gun 10 is inserted into the lower part of the tip accommodation unit 154 and thus the welding tip 20 is combined with the tip of the shank 12 is corrected.

Such an equalizer member 160 is configured to include a pair of fixation plates 162 installed on a top surface of the connection plate 112 with the body 152 interposed between the pair of fixation plates 162, shafts 164 inserted into respective through holes 152a spaced apart from each other at a specific distance in a width direction thereof under the body 152 in such a way as to penetrate the through holes 152a and each configured to have both ends combined with the pair of fixation plates 162, and coil springs 166 that are placed between the body 152 and the fixation plates 162 and that apply elastic force to the body 152.

In this case, alien substance prevention covers (not illustrated) for preventing an alien substance from being attached to the coil springs 166 may be installed outside the coil springs 166. The alien substance prevention cover preferably is made in a bellow type that corresponds to the shape of the coil spring 166.

Furthermore, a miss-input prevention bracket 156a is installed on one side of the input hole 156. The miss-input prevention bracket 156a prevents the welding tip 20 from being input to the tip accommodation unit 154 through the tip input hole 156 when the input direction of a welding tip supplied to the tip accommodation unit 154 through the tip input hole 156 is reversed.

Moreover, tip supply means 170 for supplying the welding tip 20 to the tip setting means 150 is installed on top of the tip setting means 150.

Referring to FIG. 12, such tip supply means 170 is configured to include a body 172 having a tip storage unit 172a formed therein in a height direction thereof, an opening 174 formed at a specific location of the bottom of the body 172 in such a way as to communicate with the tip storage unit 172a, an opening and closing lever 178 that is rotatably hinged and combined with an incision part 176 formed at the bottom of the body 172 from the opening 174 in the length direction and that opens and closes the opening 174, and covers 179 combined with both sides of the body 172.

In this case, the tip storage unit 172a is configured to have a shape, such as an 'S', 'M', or 'W' shape. The tip storage unit 172a preferably is configured so that the welding tip 20 input through the opening 174 can be moved from the top of the tip storage unit 172a to the bottom due to its own weight.

In this case, a spring 178a is provided between the bottom of the incision part 176 and the opening and closing lever 178. The spring 178a applies elastic force to the opening and closing lever 178 so that the opening and closing lever 178 may be elastically and rotatably moved.

Moreover, at least one location setting block 180 is provided at the bottom of the body 172 and is spaced apart from the opening and closing lever 178 at a specific distance. The location setting block 180 provides guidance to the tip supply means 170 so that it is precisely combined with a top surface of the tip setting means 150.

That is, when the tip supply means 170 is combined with the top surface of the tip setting means 150 so that the welding tip 20 received in the tip storage unit 172a of the tip supply means 170 is supplied to the tip accommodation unit 154 of the tip setting means 150, the location setting block 180 provided at the bottom of the body 172 of the tip supply means 170 is seated in a seating groove 152b provided to face the input hole 156 formed at the top surface of the tip setting means 150.

At the same time, the opening and closing lever 178 has one end brought in contact with a top surface of the body 152 of the tip setting means 150 and the other end inserted into accommodation grooves 153 formed between the input hole 156 and the seating grooves 152b that are formed at the top surface of the body 152 of the tip setting means 150.

That is, when one end of the opening and closing lever 178 comes in contact with the top surface of the body 152 of the tip setting means 150, the other end of the opening and closing lever 178 is inserted into the accommodation grooves 153 formed between the input hole 156 and the seating groove 152b that are formed at the top surface of the body 152 of the tip setting means 150. Accordingly, the closed input hole 156 is opened by the opening and closing lever 178, and thus the welding tip is smoothly supplied from the tip supply means 170 to the tip setting means 150.

Meanwhile, tip dressing means 250 capable of dressing the welding tip 20 combined with the tip of the shank 12 of the spot welding gun 10 is installed on one side of the post frame 110. The tip dressing means 250 is a known art, and a detailed description thereof is omitted.

Moreover, a dressing support 252 for accommodating the cutting powder of the welding tip 20 dressed by the tip dressing means 250 preferably is provided at the lower part of the tip dressing means 250.

Furthermore, dressing sensors 260 for checking the dressing state of the welding tip 20 by measuring the color of the welding tip 20 dressed by the tip dressing means 250 are provided at specific locations on a top surface of the tip dressing means 250. A color analysis sensor preferably is used.

Such a dressing sensor 260 determines that the dressing state of the welding tip 20 is normal if the color of the dressed face of the welding tip 20 is yellow, and determines that the dressing state of the welding tip 20 is poor if the color of the dressed face of the welding tip 20 is black. A method of checking the dressing state of the welding tip 20 includes dressing the welding tip 20, moving the spot welding gun 10 to the dressing sensors 260 so that the welding tip 20 combined with the tip of the shank 12 is placed at the dressing sensors 260, and then sensing the dressed face of the welding tip 20.

The operation of the apparatus for replacing the welding tip of a spot welding gun according to the first embodiment of the present invention is described below.

First, the opening and closing lever 178 that closes the opening 174 formed to communicate with the tip storage unit 172a so that the welding tip 20 is stored in the tip storage unit 172a formed within the body 172 of the tip supply means 170 in a height direction is rotatably moved. Next, when the welding tip 20 is supplied through the opening 174 so that it is stored in the tip storage unit 172a and the tip supply means 170 is combined with the top of the tip setting means 150, the welding tip 20 stored in the tip storage unit 172a is supplied to the tip accommodation unit 154 of the tip setting means 150.

Thereafter, the welding tip 20 combined with the tip of the shank 12 is removed by moving the tip of the shank 12 of the spot welding gun 10 through the tip removal means 120.

In this case, in a process of removing, by the tip removal means 120, the welding tip 20 combined with the tip of the shank 12 of the spot welding gun 10, as illustrated in FIG. 7, when the tip of the shank 12 of the spot welding gun 10 with which the welding tip 20 is combined is inserted into the top of the incision parts 138a formed on the left and right faces of the body 138 of the tip removal unit 136, the pair of guides 140 combined with the left and right faces of the body 138 in such a way as to slide and move are raised. At the same time, the tip of the shank 12 with which the welding tip is combined is fixed between the 'U'-shaped groove 140a and the stoppers 132a formed on top of the pair of guides 140.

Thereafter, when the body 138 of the tip removal unit 136 is raised by the operation of the cylinder 146, the welding tip 20 combined with the tip of the shank 12 of the spot welding gun 10 is removed from the tip of the shank 12 by the guide projections 138b that are downward slantly protruded and formed on both sides of the inside of the incision parts 138a formed at the front and rear of the body 138.

Thereafter, after the welding tip 20 is removed from the tip of the shank 12, when the spot welding gun 10 is moved to the tip setting means 150 and the tip of the shank 12 is inserted into the lower part of the tip accommodation unit 154, the welding tip 20 received in the tip accommodation unit 154 is combined with the tip of the shank 12, thereby completing the replacement of the welding tip 20.

Accordingly, the apparatus for replacing the welding tip of the spot welding gun in accordance with the first embodiment of the present invention has advantages in that workability and productivity can be improved and a safety accident can be prevented because the welding tip of the spot welding gun is automatically replaced.

Second Embodiment

Figure 8:
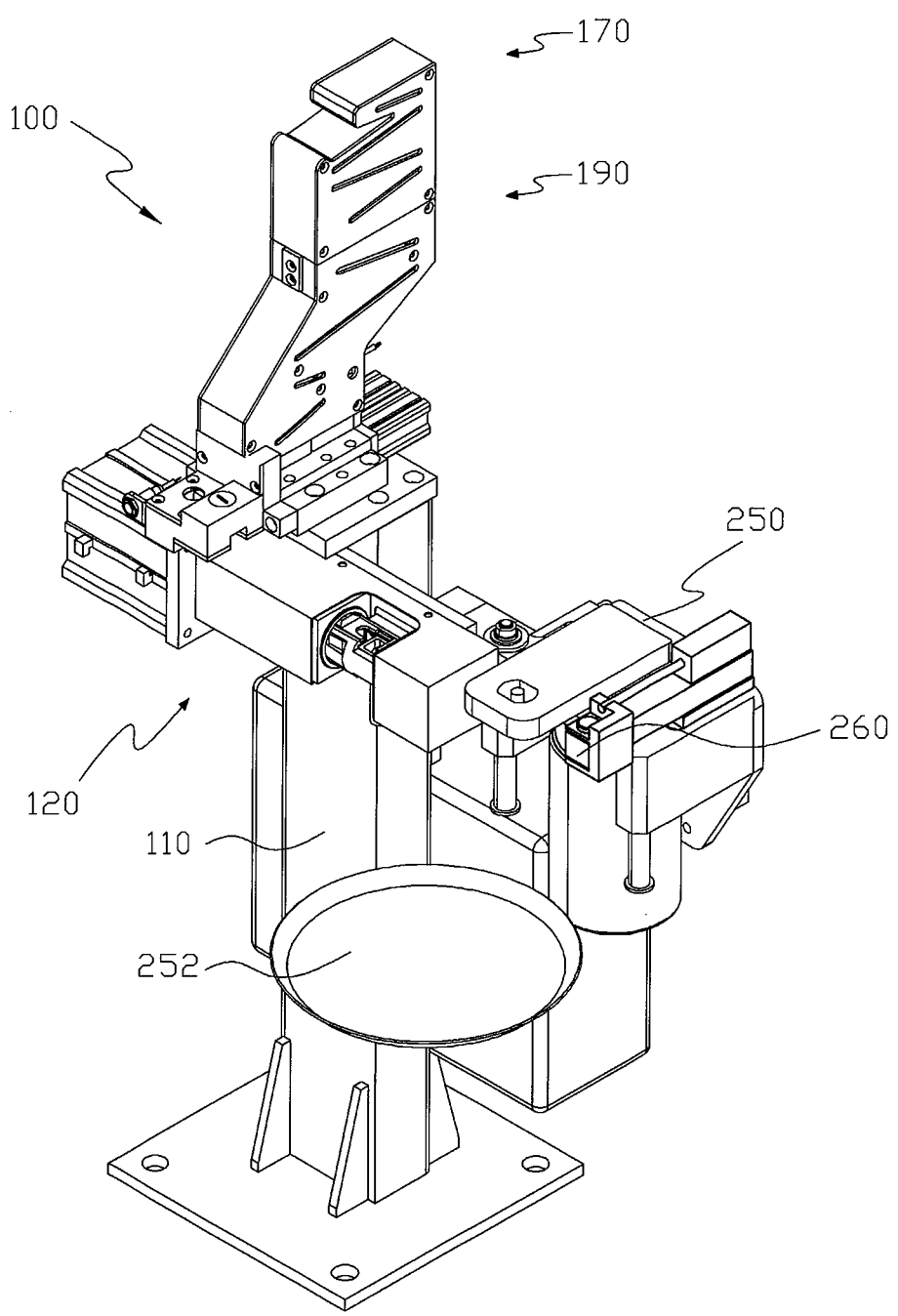
FIG. 8 is a perspective view of an apparatus for replacing the welding tip of a spot welding gun in accordance with a second embodiment of the present invention.
Figure 9:
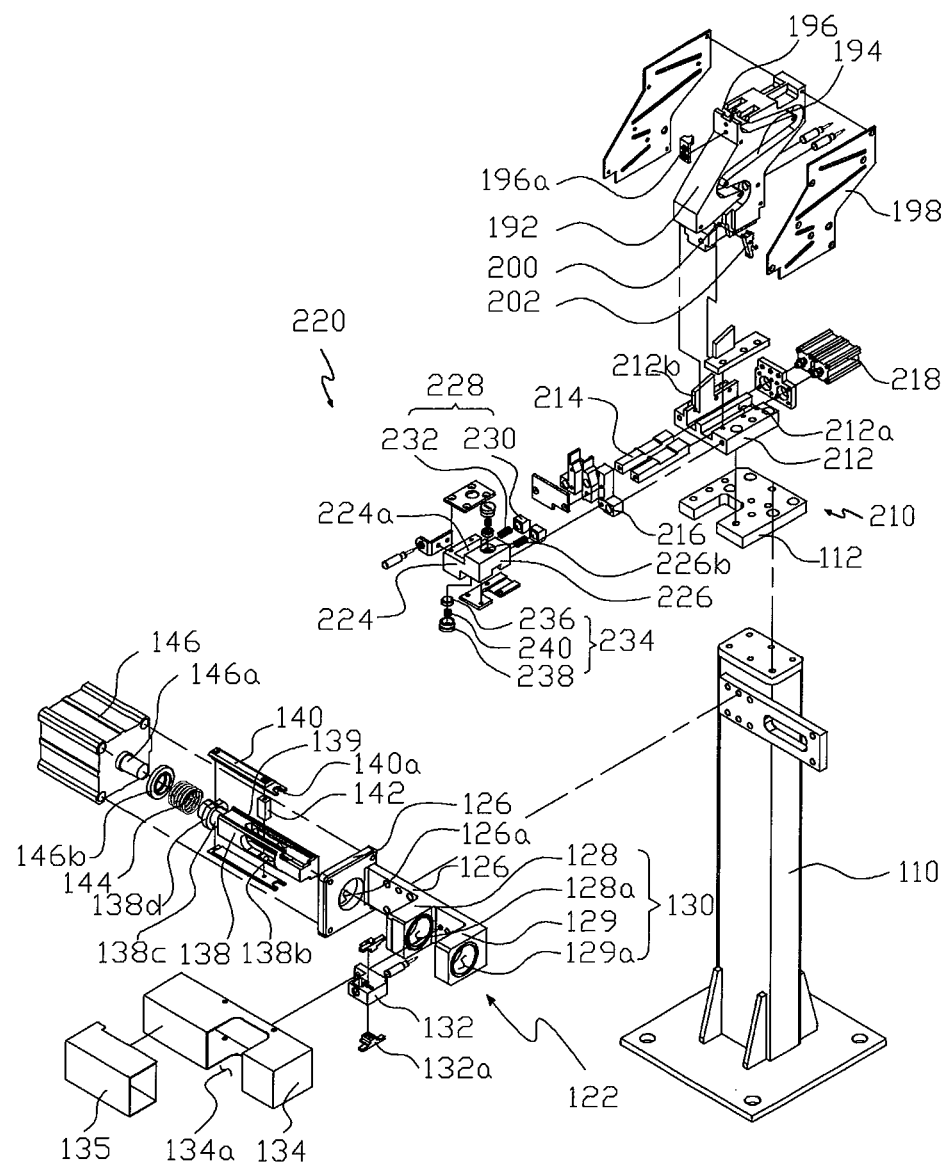
FIG. 9 is an exploded perspective view of the apparatus for replacing the welding tip of a spot welding gun illustrated in FIG. 8.
Figure 10:
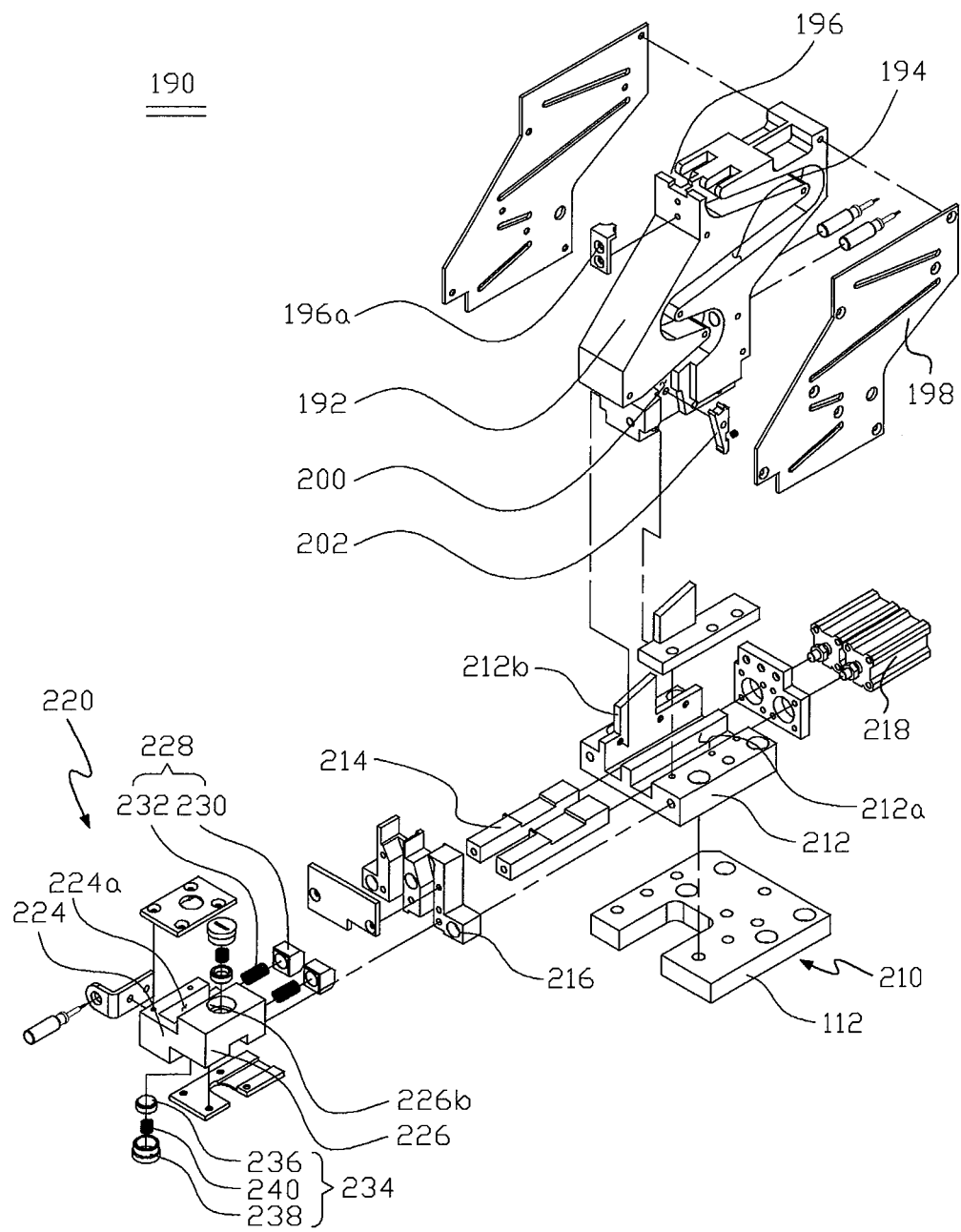
FIG. 10 is an exploded perspective view of tip setting means illustrated in FIG. 8.
Figure 11:
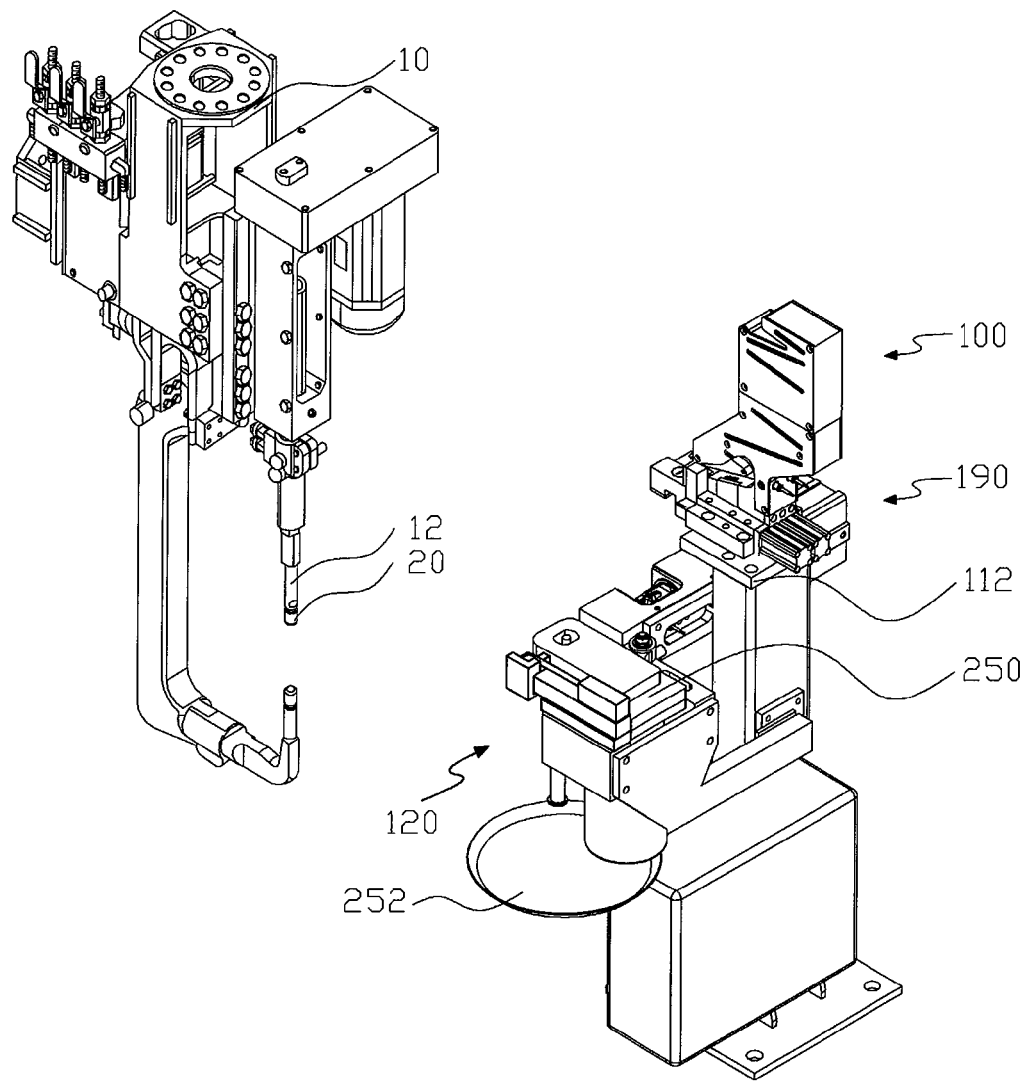
FIG. 11 is a diagram schematically illustrating the state in which the apparatus for replacing the welding tip of a spot welding gun in accordance with the second embodiment of the present invention is used.

FIG. 8 is a perspective view of an apparatus for replacing the welding tip of a spot welding gun in accordance with a second embodiment of the present invention, FIG. 9 is an exploded perspective view of the apparatus for replacing the welding tip of a spot welding gun illustrated in FIG. 8, FIG. 10 is an exploded perspective view of tip setting means illustrated in FIG. 8, and FIG. 11 is a diagram schematically illustrating the state in which the apparatus for replacing the welding tip of a spot welding gun in accordance with the second embodiment of the present invention is used.

The apparatus 100 for replacing the welding tip of a spot welding gun in accordance with the second embodiment of the present invention illustrated in FIGS. 8 to 11 is almost the same as the first embodiment illustrated in FIGS. 2 to 7 except that the tip setting means 190 combined with the connection plate 112 provided at a top surface of the post frame 110.

Accordingly, redundant descriptions are omitted.

Referring to FIGS. 8 to 11, the tip setting means 190 of the apparatus 100 for replacing the welding tip of a spot welding gun in accordance with the second embodiment of the present invention is configured to include a body 192, a tip transfer unit 210, and a tip fixation unit 220.

The body 192 includes a tip accommodation unit 194 formed in the height direction of the body, a tip input hole 196 formed at a specific location on a top surface of the body in such a way as to communicate with the tip accommodation unit 194, and covers 198 combined with both sides of the body.

In this case, the tip accommodation unit 194 is configured in a shape, such as an 'S', 'M', or 'W' shape. The tip accommodation unit 194 preferably is configured so that the welding tip 20 input through the tip input hole 196 can be moved from the top of the tip accommodation unit 194 to the bottom due to its own weight.

Furthermore, an incision part 200 is formed at a specific location on the lower part of the tip accommodation unit 194 that faces the tip input hole 196. A finger stop 202 for selectively supplying the tip transfer unit 210 with the welding tip received in the tip accommodation unit 194 is rotatably installed in the incision part 200.

Moreover, a miss-input prevention bracket 196a for preventing the welding tip 20 from being input to the tip accommodation unit 194 through the tip input hole 196 when the input direction of the welding tip 20 supplied to the tip accommodation unit 194 through the tip input hole 196 is reversed is installed on one side of the tip input hole 196.

The tip transfer unit 210 has one end combined with the bottom of the body 192 and the other end combined with a top surface of the connection plate 112.

Such a tip transfer unit 210 is configured to include a base 212, a pair of slide bars 214, a guide block 216, and a cylinder 218.

The base 212 is combined with a top surface of the connection plate 112. The base 212 includes a pair of guide grooves 212a formed on a top surface of the base in the length direction thereof and an extension unit 212b upwardly protruded and formed from one side of the pair of guide grooves 212a.

The pair of slide bars 214 is inserted into the pair of guide grooves 212a in such a way as to slide and move, and transfers the welding tip, discharged from the tip accommodation unit 194 of the body 192, to the tip fixation unit 220.

The guide block 216 is combined with one side of the base 212, and changes the direction of the welding tip 20 discharged from the tip accommodation unit 194 of the body 192. That is, the guide block 216 changes the direction of the welding tip 20 so that both ends of the welding tip 20 discharged from the tip accommodation unit 194 with both ends being horizontally placed stand up straight in a vertical direction and that the welding tip 20 is placed at the tip of the pair of slide bars 214.

The cylinder 218 is combined with the other side of the base 212, and transfers driving power to the pair of slide bars 214 so that they slide and move along the pair of guide grooves 212a.

The tip fixation unit 220 is combined with one side of the tip transfer unit 210, and fixes the welding tip 20 transferred by the tip transfer unit 210 so that the welding tip 20 is combined with the tip of the shank 12 of the spot welding gun 10.

Such a tip fixation unit 220 is configured to include a fixation block 222, a location setting member 228, and a location correction member 234.

The fixation block 222 includes a first fixation unit 224 on a top surface of which a first insertion groove 224a into which any one of the pair of slide bars 214 may be inserted is formed and a second fixation unit 226 combined with the first fixation unit 224 on one side of the first fixation unit 224 in such a way as to cross the first fixation unit 224 and configured to have a second insertion groove (not illustrated) into which another side bar 214 is inserted formed at the bottom of the second fixation unit 226.

The location setting member 228 is installed on one side of the inside of each of the first insertion groove 224a and the second insertion groove, and corrects the location of the welding tip that is transferred to the first insertion groove 224a and the second insertion groove by the pair of slide bars 214.

Such a location setting member 228 is configured to include a pair of location setting blocks 230 inserted into and installed at the first insertion groove 224a and the second insertion groove and springs 232 that have one ends supported by the insides of the first insertion groove 224a and the second insertion groove and the other ends supported by the respective ends of the pair of location setting blocks 230 and that apply elastic force to the pair of location setting blocks 230.

The location correction member 234 is installed at each of a first through hole (not illustrated) and a second through hole 226b formed at specific locations of the bottom of the first fixation unit 224 and the top of the second fixation unit 226 in such a way as to communicate with the first insertion groove 224a and the second insertion groove.

Such a location correction member 234 is configured to include a pair of location correction blocks 236 inserted into the first through hole and the second through hole 226b, respectively, a pair of control nuts 238 screwed to the first through hole and the second through hole 226b, and a spring 240 that has one end supported by the ends of the pair of location correction blocks 236 and the other end supported by the ends of the pair of control nuts 238 and that applies elastic force to the pair of location correction blocks 236.

In this case, the pair of control nuts 238 controls the elastic force applied to the pair of location correction blocks 236 through the spring 240.

Although the preferred embodiments of the present invention have been described above, those skilled in the art will appreciate that the present invention may be modified and changed in various ways without departing from the technical spirit and scope of the present invention.

INDUSTRIAL APPLICABILITY

The present invention is directed to an apparatus for replacing the welding tip of a spot welding gun. More particularly, the present invention may be used for an apparatus for replacing the welding tip of a spot welding gun, which is capable of automatically replacing the welding tip of a spot welding gun.

What is claimed is:

1. An apparatus for replacing a welding tip of a spot welding gun, comprising:
    a post frame on a top surface of which a connection plate is provided;
    tip removal means combined with one side of the post frame at a specific location of the one side; and
    tip setting means combined with a top surface of the connection plat;
    wherein the tip removal means is configured to comprise:
    a main body combined with a specific location on one side of the post frame in a length direction;
    a cylinder installed at a bottom of the main body; and
    a tip removal unit combined with one end of the cylinder and placed to slide and move within the main body, and
    wherein the main body is configured to comprise:
    a first body comprising a vertical unit combined with the one side of the post frame, a horizontal unit that is horizontally protruded and formed under the vertical unit and that has a through hole formed at a central part of the horizontal unit, and first and second extension units that are spaced apart from each other at a specific distance, protruded, and formed in a length direction of the first body on one side of the vertical unit and that comprise a first through hole and a second through hole, respectively, at centers of the first and second extension units;
    a setting block that is combined with the vertical unit so that the setting block is placed between the first and second extension units and that comprises a pair of stoppers on both sides of the setting block; and
    a cover combined with the first body.

2. The apparatus of claim 1, wherein tip supply means for supplying the welding tip to the tip setting means is installed on top of the tip setting means.

3. The apparatus of claim 2, wherein the tip supply means is configured to comprise:
    a second body having a tip storage unit formed therein in a height direction thereof;
    an opening formed at a specific location of a bottom of the second body in such a way as to communicate with the tip storage unit;
    an opening and closing lever that is rotatably hinged and combined with an incision part formed at the bottom of the second body from the opening in a length direction and that opens and closes the opening; and
    covers combined with both sides of the second body.

4. The apparatus of claim 3, wherein at least one location setting block spaced apart from the opening and closing lever at a specific distance is provided at the bottom of the second body of the tip supply means.

5. The apparatus of claim 1, wherein the tip setting means is configured to comprise:
    a third body combined with the top surface of the connection plate;

a tip accommodation unit formed within the third body in a height direction of the third body;

a tip input hole formed at a specific location of the top surface of the third body in such a way as to communicate with the tip accommodation unit; and covers combined with both sides of the third body.

6. The apparatus of claim 5, wherein the third body of the tip setting means is combined with the top surface of the connection plate in such a way as to reciprocate in a width direction of the connection plate by an equalizer member provided on the top surface of the connection plate.

7. The apparatus of claim 6, wherein the equalizer member is configured to comprise:

a pair of fixation plates installed on the top surface of the connection plate with the third body of the tip setting means interposed between the pair of fixation plates;

shafts inserted into respective through holes, spaced apart from each other at a specific distance, in a width direction of the shafts under the third body of the tip setting means in such a way as to penetrate the through holes and each configured to have both ends combined with the pair of fixation plates; and coil springs that are placed between the third body and the fixation plates and that apply elastic force to the third body.

8. The apparatus of claim 1, wherein a tip collection tank is combined with one side of the cover.

9. The apparatus of claim 1, wherein the tip removal unit is configured to comprise:

a fourth body that comprises space therein and incision parts that are formed on an outside of the fourth body and that communicate with the space in a circumferential direction of the fourth body;

a pair of guides having respective U-shaped grooves formed on upper parts of the guides and combined with guide grooves formed in a length direction of the fourth body on left and right sides of the fourth body in such a way as to slide and move;

a guide block that is placed within the space of the fourth body and has both sides combined with and fixed to respective one sides of the pair of guides; and a spring having one end supported by a flange unit that is provided on an outer circumference surface of an extension unit extended and formed under the fourth body and the other end supported by a guide ring that is inserted into a cylinder rod provided in the cylinder.

10. The apparatus of claim 9, wherein a pair of guide projections is downward slantly protruded and formed on both sides of an inside of incision parts that belong to the incision parts and that are formed at a front and rear of the fourth body of the tip removal unit.

11. The apparatus of claim 1, wherein the tip setting means is configured to comprise:

a fifth body comprising a tip accommodation unit formed in a height direction of the fifth body, a tip input hole formed at a specific location on a top surface of the fifth body in such a way as to communicate with the tip accommodation unit, and covers combined with both sides of the fifth body;

a tip transfer unit having one end combined with a bottom of the fifth body and the other end combined with the top surface of the connection plate; and a tip fixation unit that is combined with one side of the tip transfer unit and that fixes the welding tip transferred by the tip transfer unit.

12. The apparatus of claim 11, wherein the tip transfer unit is configured to comprise:

a base that is combined with the top surface of the connection plate and that comprises a pair of guide grooves formed on a top surface of the base in a length direction of the base and an extension unit upwardly protruded and formed from one side of the pair of guide grooves;

a pair of slide bars inserted into the pair of guide grooves in such a way as to slide and move;

a guide block combined with one side of the base; and a cylinder that is combined with the other side of the base and that moves the pair of slide bars along the pair of guide grooves in a sliding way.

13. The apparatus of claim 12, wherein the tip fixation unit is configured to comprise:

a fixation block comprising a first fixation unit on a top surface of which a first insertion groove into which any one of the pair of slide bars is able to be inserted is formed and a second fixation unit combined with the first fixation unit on one side of the first fixation unit in such a way as to cross the first fixation unit and configured to have a second insertion groove into which another side bar is inserted formed at a bottom of the second fixation unit;

a location setting member that is installed on one side of an inside of each of the first insertion groove and the second insertion groove and that corrects a location of the welding tip transferred to the first insertion groove and the second insertion groove by the pair of slide bars; and a location correction member installed at each of a first through hole and a second through hole formed at specific locations of a bottom of the first fixation unit and a top of the second fixation unit in such a way as to communicate with the first insertion groove and the second insertion groove.

14. The apparatus of claim 12, wherein:

an incision part is formed at a specific location on a lower part of the tip accommodation unit that faces the tip input hole, and a finger stop that selectively supplies the tip transfer unit with the welding tip received in the tip accommodation unit is rotatably installed in the incision part.

15. The apparatus of claim 5, wherein a miss-input prevention bracket that prevents the welding tip from being input to the tip accommodation unit through the tip input hole when an input direction of the welding tip supplied to the tip accommodation unit through the tip input hole is reversed is installed on one side of the tip input hole.

16. The apparatus of claim 1, wherein tip dressing means is installed on one side of the post frame.

17. The apparatus of claim 16, wherein dressing sensors that check a dressing state of the welding tip by measuring a color of the welding tip dressed by the tip dressing means are provided at specific locations on a top surface of the tip dressing means.

18. The apparatus of claim 12, wherein a miss-input prevention bracket that prevents the welding tip from being input to the tip accommodation unit through the tip input hole when an input direction of the welding tip supplied to the tip accommodation unit through the tip input hole is reversed is installed on one side of the tip input hole.

* * * * *